United States Patent [19]
Hopgood

[11] Patent Number: 5,882,026
[45] Date of Patent: Mar. 16, 1999

[54] ROTARY DRIVE MECHANISM

[76] Inventor: Henry Arthur Hopgood, 15 Blyth Street, Cromwell, New Zealand

[21] Appl. No.: 569,089
[22] PCT Filed: May 31, 1994
[86] PCT No.: PCT/NZ94/00049
§ 371 Date: Mar. 11, 1996
§ 102(e) Date: Mar. 11, 1996
[87] PCT Pub. No.: WO94/27860
PCT Pub. Date: Dec. 8, 1994

[30] Foreign Application Priority Data

Jun. 1, 1993 [NZ] New Zealand ............................ 247760

[51] Int. Cl.$^6$ ....................................................... G60B 1/04
[52] U.S. Cl. .............................. 280/260; 301/5.1; 301/56; 301/104
[58] Field of Search ..................................... 280/212, 259, 280/260; 301/5.1, 54, 55, 56, 60, 57, 104, 58; 74/63, 516, 517

[56] References Cited

U.S. PATENT DOCUMENTS

| | | | |
|---|---|---|---|
| 1,272,723 | 7/1918 | Sullivan | 301/55 |
| 1,653,612 | 12/1927 | Baker | 301/55 |
| 2,378,154 | 6/1945 | Nelson | 301/58 |
| 4,917,162 | 4/1990 | De Longcamp | 301/55 |
| 5,110,190 | 5/1992 | Johnson | 301/55 |

FOREIGN PATENT DOCUMENTS 0299901  12/1990  Japan ..................................... 301/104

*Primary Examiner*—Anne Marie Boehler
*Attorney, Agent, or Firm*—Thomas R. Vigil

[57] ABSTRACT

A drive mechanism for a driven member having a hub and rim coaxial with and supported by the hub includes at least two transmission cables which extend between the hub and the rim. One end of each transmission cable is secured to the hub and extends from the hub over a guiding sheave journalled within a pulley block fastened to the rim and then extends from the pulley block to the next contiguous pulley block in a direction opposite to that in which the driven member is to be rotated, The distal end of the transmission cable is attached to this next contiguous pulley block. Tensioners are provided for pre-tensioning each cable. The driven member can be the rear wheel of a bicycle whereby the extension of the cables can provide a lag between the turning of the hub and the rim, thereby effectively providing variable output.

5 Claims, 3 Drawing Sheets

ROTARY DRIVE MECHANISM

The present invention relates to a drive mechanism particularly for use in rotary drive systems.

TECHNICAL FIELD

The invention is to be applied to rotary drive systems in which a driven member such as for example a wheel, a propeller, a rotatable blade and other forms of apparatus are intended to be driven for rotatory movement from a remote manual driving means. The driving means may consist for instance of a handle or handles or pedals which are linked by transmission means to the driven member so that rotation of the driving means will result in rotation of the driven member. A specific application of the rotary drive system is in relation to a pedal driven conveyance such as a pedal bicycle or tricycle.

The driven member is generally arranged to be driven from a remote location by a transmission means such as a drive belt or a chain which passes over a belt pulley or sprocket attached to the driven member and over a driving pulley or sprocket so journalled that the drive pulley sprocket can be manually turned by pressure exerted by the legs or arms of the operator. In many instances it is desirable to vary the ratio of the speed of rotation of the driven member to that of the drive pulley or sprocket for the purpose either or increasing the speed of rotation of the driven member in relation to the drive pulley or sprocket or of decreasing the speed and thereby allowing an increased torque to be applied to the driven member. Various means as are known in the art are employed for this purpose. One such means comprises a series of stepped pulleys of varying diameters where the transmission means is in the form of a flexible belt or a series of stepped sprockets of varying diameters where the transmission means is in the form of a chain.

In the case of a pedal conveyance such as a bicycle, the speed varying means generally consists of a series of sprockets of varying diameters fixed to the driven wheel and a series of drive sprockets of varying diameters so that the link means which is generally a chain, can be moved to mesh with a selected pair of sprockets to obtain the optimum speed of rotation of the driven wheel in relation to the drive sprocket.

While it is possible to improve the torque applied to the driven member by means such as that hereinbefore described, nevertheless it is highly desirable that means be provided so that the amount of torque can be increased to an optimum value by means other than the known gear multiplication ratios.

OBJECT OF THE INVENTION

It is therefore an object of this invention to provide an improved drive mechanism for a rotary drive system of the kind described.

DISCLOSURE OF THE INVENTION

Accordingly, one form of the invention comprises a rotary drive mechanism including a driven member having a hub and a rim substantially coaxial with and supported by said hub which is adapted to be journalled to a frame to allow rotation of the driven member in relation to the said frame, characterized in that the driven member includes a transmission hub co-axial with said hub and at least two transmission cables each having one end anchored to said transmission hub to extend substantially tangetially from said transmission hub at a position substantially 180 ° opposite each other and each having the other end passing around a guiding sheave supported by a first pulley block attached to said rim and extending from the said pulley block towards and anchored to a second pulley block in a direction opposite that in which the driven member is to be rotated.

Preferably the pulley blocks are equidistantly spaced from each other on the said rim.

Preferably each pulley block includes main sheave, a guiding sheave and an anchor point and wherein each transmission extends form the transmission hub around the main sheave and over the guiding sheave and has its distal end anchored to the anchor point of a contiguous pulley block.

Preferably the drive mechanism includes four anchor points on said transmission hub, with each anchorage point being equidistantly spaced on a notional circumference from the axis of the hub and four pulley blocks equidistantly spaced on said rim, wherein one end of each transmission cable is anchored to an anchorage point on the transmission hub and the other end of each transmission cable extends around the sheave of a pulley block and extends in a direction from said pulley block opposite that to which the driven member is to be rotated and is anchored to a contiguous pulley block.

Preferably the drive mechanism includes means to pretension each transmission cable.

BEST MODE OF CARRYING OUT THE INVENTION

Figure 1:
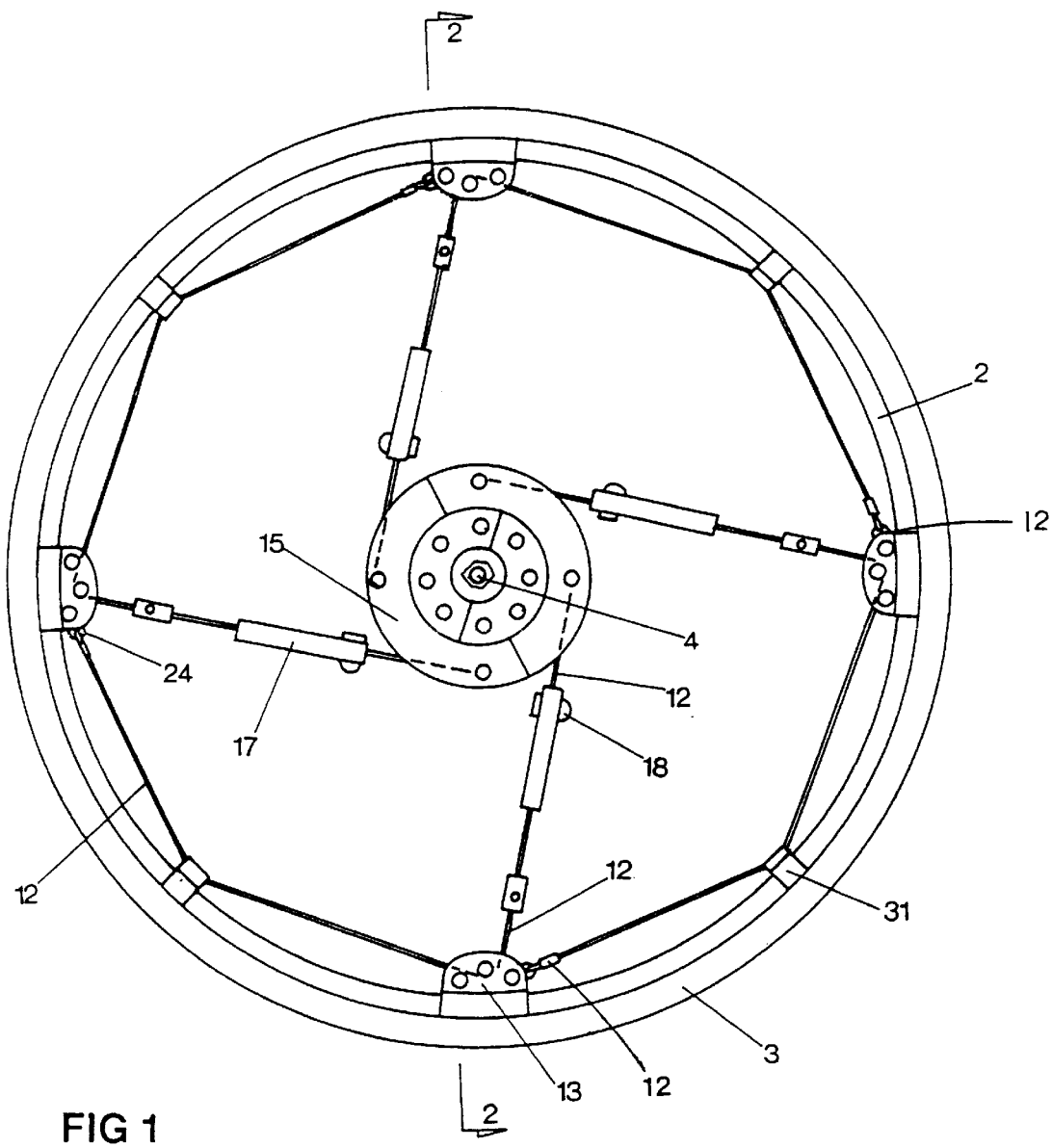
FIG. 1 is a side view in a partly diagrammatic form if a driven wheel which includes the preferred form of drive mechanism.

A typical wheel such as the rear wheel of a pedal bicycle is indicated in FIG. 1 and comprises a rim 2 mounting a pneumatic tyre 3 and having spokes (not shown in the drawings) which may be of a conventional construction and which radiate from a central hub 5 which is journalled for rotation about an axle 4. When the wheel is for use with a pedal bicycle the axle 4 will be mounted on a suitable bicycle frame (not shown in the drawings) as is known in the art. Drive sprockets 6 which may be single or multiple sprockets as indicated in the drawings are also journalled to the axle 4. Since the hub 5 is free to rotate on the axle 4 then the whole wheel with the drive sprockets 6 may also freely rotate on the axle.

In accordance with the present invention, in addition to the spokes, the drive from the sprockets 6 is transmitted to the rim 2 of the wheel by means of a transmission cable 12 and associated apparatus.

Preferably the drive mechanism utilizes four transmission cables 12 as indicated in FIG. 1 together with their associated apparatus and while this is the highly preferred number the invention encompasses any other desired number of combined transmission cable and associated apparatus.

As shown in the drawings, the transmission cables 12 lie in a notional radius of the wheel extending from around the central axis thereof to the rim 2. One end of each transmission cable 12 is suitably anchored to a transmission hub 15 which is connected to the sprockets 6 so that when the drive sprockets 6 are rotated then the transmission hub 15 will also rotate.

Figure 3:
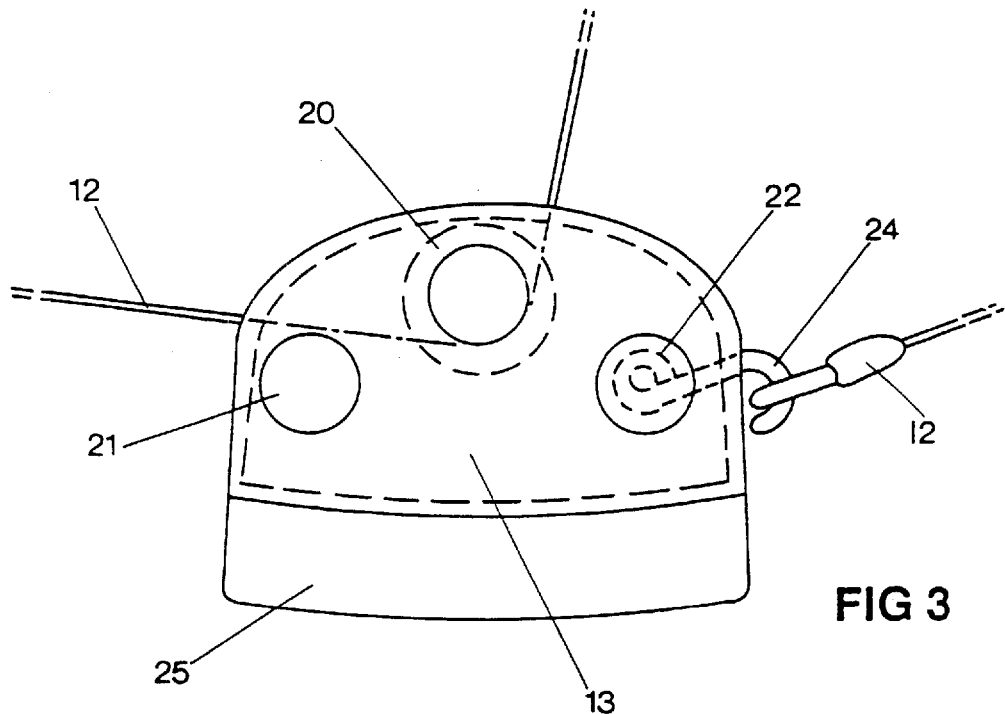
FIG. 3 is a diagrammatic view of a detail.
Figure 4A:
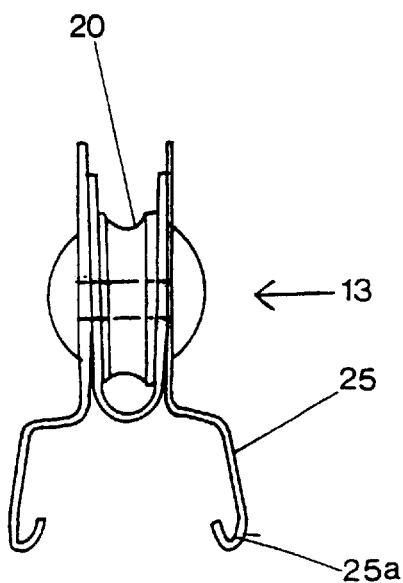
FIG. 4a and 4b are diagrammatic views of further details.
Figure 4B:
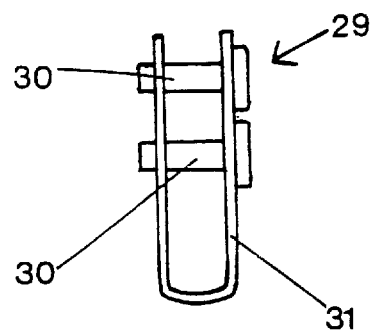

Each transmission cable 12 is adapted to cooperate with a pulley block 13, shown more particularly in FIG. 4a. Each pulley block 13 has arms 25 which when the mechanism is to be applied to a bicycle wheel is formed with an attachment means such as that indicated at 25a which will clamp over the rim 2 of the wheel to locate and fix the pulley block on the rim. Suitable means (not shown in the drawings) are provided to maintain the arms 25 of the pulley block 13 clamped to the rim 2. Each pulley block 13 includes a main sheave 20 (see FIG. 3), a guiding sheave 21 and an anchor point 22. Both the main sheave 20 and the guiding sheave 21 are journalled so they may freely rotate in the pulley block 13.

Figure 2:
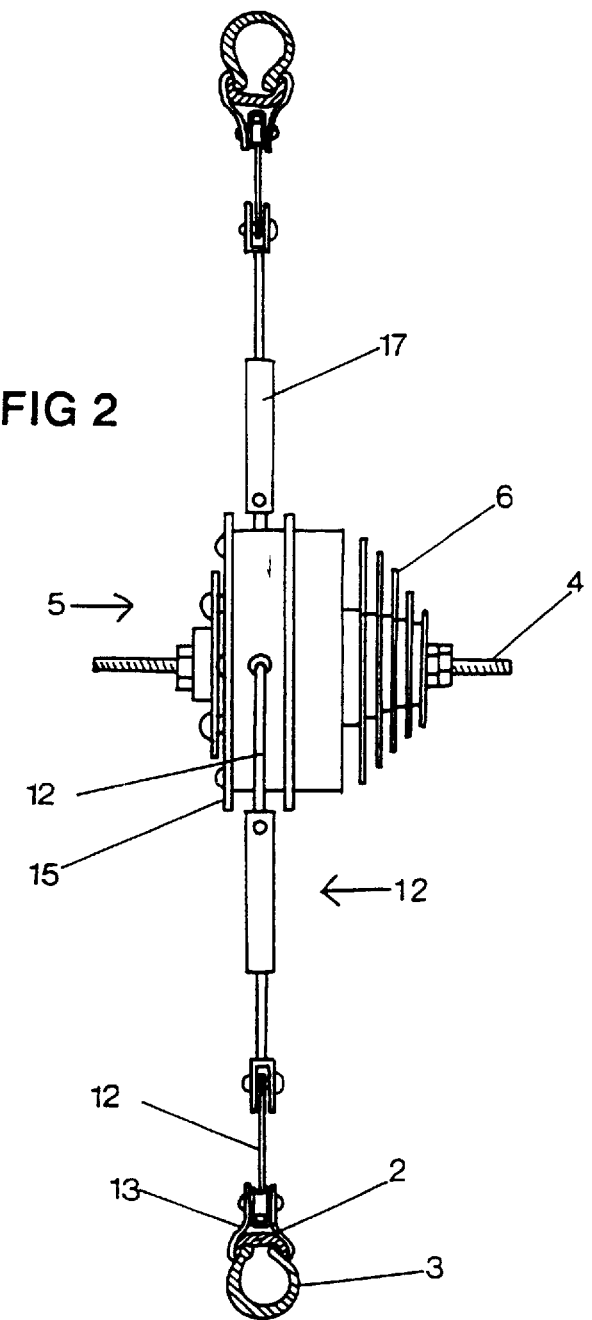
FIG. 2 is a diagrammatic partially sectional view along the line 2—2 of FIG. 1.

As can be seen from the drawings, the transmission cable 12 extends from the hub 15, around the main sheave 20 and over the guiding sheave 21 of a first pulley block 13 and has its distal end anchored to the anchor 22 of a second anchor block 13. For this purpose a terminal hook 24 (see FIG. 3) may be attached to the anchor point 22 so that the distal end of the transmission cable can be readily anchored to the pulley block 13. The transmission cable 12 passes through a suitable guide 29 which may also be attached to the rim 2, the guide having arms 31 which support guide pins 30 so that the cable can pass between two guide pins in the guide block. As can be seen particularly form FIG. 2, the transmission cable 12 is attached to the hub 15 at a point approximately 90° from a notional line drawn between the axle 4 and the sheave 20 over which the transmission cable passes. If the wheel as shown in FIG. 1 is intended to rotate in an anticlockwise direction, then the point of attachment of the transmission cable 12 to the hub 15 is offset 90° in an anticlockwise direction.

Each transmission cable also includes a tensioning device 17 which will act to provide the desired degree of tension to the transmission cable 12. The tensioning device 17 can consist for instance of any suitable means as is known in the art which will be able to exert the desired static tension to the transmission cable 12. In a highly preferred form of the invention the tensioning device 17 may include suitable screw adjustment connectors such as those indicated at 18 in FIG. 1. The transmission cable 12 may consist of two parts, one part extending between the transmission hub 15 and one end of the tensioning device 17 and the other end extending between the tensioning device and the termination at the distal end.

When rotary force is applied to the drive sprocket, this is transmitted through the hub via the spokes to the rim 2 and also through the hub 15 via the transmission cables 12 to the rim 2 of the wheel. The turning moment of the hub 15 will introduce an additional tension on the transmission cables 12 which as before described are anchored at points offset from the axis of the drive sprocket 6. This particular arrangement will induce a further tension which is transmitted to the rim 2 of the wheel to cause rotary movement thereof. The wheel is thus pulled in the direction of rotation when the tension in the cable reaches a threshold level which is dependent on the load on the bicycle, the gradient of the hill being climbed and other factors as will be apparent.

By reason of the drive mechanism of this invention the rotary motion of the driving sprocket 6 is relatively efficiently transmitted by means of a generally tangential pull on the wheel rim 2.

For foregoing describes the invention including preferred forms thereof. Variations and modifications as will be obvious to those skilled in the art are intended to be incorporated within the scope hereof as defined in the appended claims.

I claim:

1. A rotary drive mechanism including a driven member having a hub and a rim substantially coaxial with and supported by said hub which is adapted to be journalled to a frame to allow rotation of the driven member in relation to the said frame, characterized in that the driven member includes a transmission hub co-axial with said hub and at least two transmission cables each having one end anchored to the transmission hub to extend substantially tangentially from the transmission hub at a position substantially 180° opposite each other and each having the other end passing around a guiding sheave supported by a first pulley block attached to the rim and extending from the pulley block towards and anchored to a second pulley block in a direction opposite that in which the driven member is to be rotated.

2. The rotary drive mechanism as claimed in claim 1, wherein pulley blocks are equidistantly spaced from each other in the said rim.

3. The rotary drive mechanism as claimed in claim 1, wherein each pulley block includes a main sheave, a guiding sheave and an anchor point and wherein each transmission cable extends from the transmission hub around the main sheave and over the guiding sheave and has its distal end anchored to the anchor point of a contiguous pulley block.

4. The rotary drive mechanism as claimed in claim 1, including:

four anchorage points on said transmission hub, with each anchorage point being equidistantly spaced on a notional circumference from the axis of the hub; and four pulley blocks equidistantly spaced on said rim wherein one end of each transmission cable is anchored to an anchorage point on the transmission hub and the other end of each transmission cable extends around the sheave of a pulley block and extends in a direction from said pulley block opposite that to which the driven member is to be rotated and is anchored to a contiguous pulley block.

5. The rotary drive mechanism as claimed in claim 1, including means to pre-tension each transmission cable.

* * * * *